Patented June 27, 1950

2,512,649

UNITED STATES PATENT OFFICE 2,512,649

PRODUCTION OF ISONONANES

Frank L. Howard, Silver Spring, and Donald B. Brooks, Chevy Chase, Md., assignors to the United States of America as represented by the Secretary of Commerce No Drawing. Application July 29, 1947, Serial No. 764,548

10 Claims. (Cl. 260—676)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to the production of highly branched chain hydrocarbons and it particularly relates to the production of isononanes and more particularly it relates to the production of 2,2,3,3, tetramethylpentane (tetrane), 2,2,3,4-tetramethylpentane, and 2,3,3,4-tetramethylpentane.

Isoparaffins of this type are difficult to produce because of their highly branched configuration and ordinary methods of synthesis give low yields or none at all. These compounds are not formed in substantial quantities by processes of isomerization because they are not present in appreciable quantities under equilibrium conditions of pressure and temperature.

Heretofore only one method for the production of tetrane has been found operable. It involves the dehydration of 2,3,3-trimethyl-2-butanol to form 2,3,3-trimethyl-1-butene; hydrohalogenation of the olefin so formed to produce a 2-halo-2,3,3-trimethylbutane; and subjecting the alkyl halide to Grignard reactions with ethylmagnesium halides and thereby forming a mixture of tetrane and 2,3,3 - trimethyl - 1 - butene. This method has the disadvantage of low yields of tetrane, high consumption of magnesium to produce the ethyl Grignard reagent, and very large quantities of ether are used in the reaction.

Accordingly it is an object of this invention to provide a method for the production of isononanes such as 2,2,3,3-tetramethylpentane; 2,2,3,4-tetramethylpentane; 2,3,3,4-tetramethylpentane; and the like.

These objects and advantages are accomplished in accordance with this invention by the copolymerization of a tertiary alcohol and a secondary alcohol, separation of the olefinic fractions, hydrohalogenation of the separated olefinic fractions, and thereafter methylating the hydrohalogenated olefinic fractions.

A preferred embodiment of the invention demonstrates the production of isononanes. The olefinic raw materials (3,3,4-trimethyl-2-pentene and 2,3,4-trimethyl-2-pentene) are preferably obtained by efficient fractionation of commercial mixtures of butene dimers in which the products of copolymerization between isobutene and n-butenes are present—for example the "hot acid polymer" of the Shell Oil Company. These olefinic raw materials may also be produced by the co-polymerization of tertiary butyl alcohol and secondary butyl alcohol in the presence of sulfuric acid whereby a mixture of olefinic polymers such as 3,4,4-trimethyl-2-pentene; 2,3,4-trimethyl-2-pentene, and other polymers is produced; thereafter fractionally distilling the reaction mixture to separate and collect 3,4,4-trimethyl - 2 - pentene and 2,3,4 - trimethyl - 2 - pentene. These recovered olefinic fractions are then separately treated with anhydrous hydrogen chloride whereby 3-chlor-3,4,4-trimethylpentane is formed from the 3,4,4-trimethyl-2-pentene and a mixture of 2-chloro-2,3,4, trimethylpentane and 3-chloro-2,3,4-trimethylpentane is formed by the reaction of hydrogen chloride with the 2,3,4-trimethyl-2-pentene. These reaction products are then separately methylated by treatment with suitable methylating reagents such as dimethyl zinc, and methylmagnesium halides. The methylation of 3-chloro-3,4,4-trimethylpentane yields tetrane (2,2,3,3-tetramethylpentane) and the pure compound can be recovered by collecting the fraction distilling between about 139–142 degrees centigrade at 760 mm. Hg, using a fractionating column of 20 or more theoretical plates. The methylation of the 2- and 3-chloro-2,3,4-trimethylpentane mixture results in the formation of a mixture of 2,3,3,4- and 2,2,3,4-tetramethylpentanes. The pure compounds can be recovered separately by fractional distillation at 760 mm. Hg as heretofore described and collecting the fractions boiling between about 131.5 and 134.5 degrees centigrade (2,2,3,4-tetramethylpentane) and about 140 and 143 degrees centigrade (2,3,3,4-tetramethylpentane), both at 760 mm. Hg, when distilled as previously designated.

The following reactions and description will show more specifically a method whereby this invention may be carried out in regards to the production of isononanes; a convenient method for preparation of starting materials is given below:

(1)

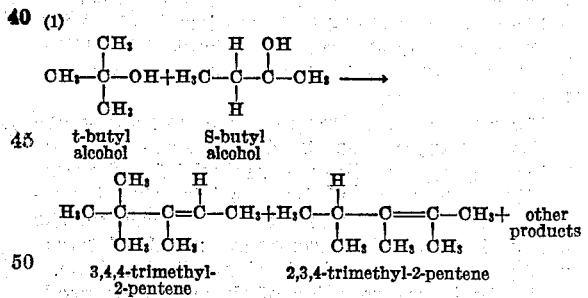

When secondary butyl alcohol and tertiary butyl alcohol are reacted in the presence of sulfuric acid or a non-oxidizing mineral acid such as phosphoric acid, copolymerization occurs and, when sulfuric acid is used, the resulting product has been found to be a mixture of about 25 percent 2,4,4-trimethyl-1-and-2-pentenes, about 23 percent 3,4,4-trimethyl-2-pentene, about 37 percent 2,3,4-trimethyl-2-pentene, and about 15 percent higher boiling material polymerized in the presence of a non-oxidizing mineral acid, usually sulfuric acid, phosphoric acid, hydrogen fluoride, and the like, the resulting product, when sulfuric acid was used, has been found to be a mixture of about 25 percent 2,4,4-trimethyl-1-and-2-pentenes, about 23 percent 3,4,4-trimethyl-2-pentene, about 37 percent 2,3,4-trimethyl-2-pentene, and about 15 percent higher boiling material. This reaction can be conveniently carried out following the procedure of Whitmore et al. (Journal of the American Chemical Society, vol. 63, p. 756 (1941)), wherein the secondary alcohol is dissolved in an excess of sulfuric acid and the solution is then heated to temperatures not greater than about 80 degrees centigrade. Thereafter the t-butyl alcohol is slowly added to the warm solution at a rate such that the temperature of the reaction mixture will not cause excessive loss of product as gas (butylenes). The reaction mixture is constantly agitated during the reaction process. In order to minimize losses of the reactants and reaction products it is preferred to employ a sealed reaction vessel which is fitted with a reflux condenser or like condensing means capable of condensing escaping vapors and returning the condensed vapors to the reaction vessel. To further minimize losses it is preferred to employ a closed reaction vessel and sealed agitating means.

On completion of the addition of the t-butyl alcohol, the reaction mixture is permitted to cool to a temperature not greater than about 25 degrees centigrade and the agitation stopped. The desired reaction product will separate as an oil phase from the reaction mixture. This oil phase may be collected by any suitable means for the separation of two liquid phases such as decanting, siphoning and the like. In order to remove acid and other impurities it is presently preferred to wash the recovered reaction product with water and a dilute alkali solution such as 5% sodium carbonate, and then to dry the product with a non-reactive desiccant such as calcium chloride prior to separating the olefin fractions.

The separation of the olefinic fractions can be suitably accomplished by such distillation means as will permit the separation of fractions having relatively close boiling points. The use of a column having at least about 30 theoretical plates has been found suitable for the separation of olefinic fractions resulting from the co-polymerization of s- and t-butyl alcohols. The dried olefinic product is fractionally distilled and the fractions boiling at about 111°–113.5° centigrade (3,4,4-trimethyl-2-pentene) and at about 115°–117.5° centigrade (2,3,4-trimethyl-2-pentene) are collected separately.

Thereafter these fractions are separately hydrohalogenated; the 3,4,4-trimethyl-2-pentene being employed as the raw material for the production of tetrane and the 2,3,4-trimethyl-2-pentene can be employed as the raw material for the production of the isononanes: 2,3,3,4-tetramethylpentane and 2,2,3,4-tetramethylpentane.

The hydrohalogenation of these olefinic products may be carried out by the following reactions (2a) and (2b).

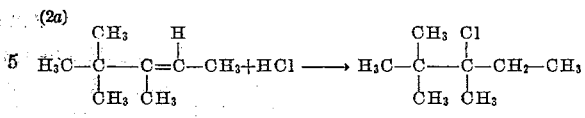

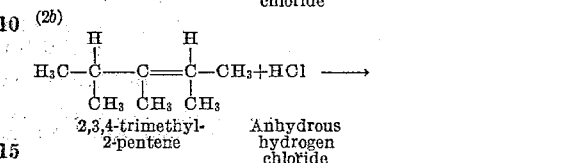

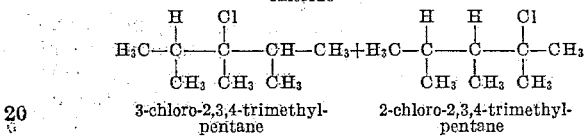

A suitable way for carrying out the hydrohalogenation reactions (2a) and (2b) is by introducing the olefinic fraction into a stream of anhydrous hydrogen chloride and passing the mixture through a cooled reaction zone, collecting the hydrohalogenated product, adsorbing or recycling the unreacted hydrogen chloride, if any, and recycling the unreacted olefin. The reaction zone is cooled to a temperature which will permit the reaction rate to be controlled and yet will be sufficiently high to prevent the hydrohalogenated product from crystallizing and plugging the reaction zone before the reaction is substantially complete. For example, by cooling the reaction zone to temperatures between about −55 to −65 degrees centigrade, it is possible to convert 60% of the olefin to the chloride in a relatively short time and without the crystallization of the hydrohalogenated product.

Thereafter the hydrohalogenated products which have been separately collected can be methylated by suitable reactions with reagents such as dimethyl zinc and methyl Grignard reagent; the product from reaction (2a) above yielding tetrane and the product from reaction (2b) yielding a mixture of 2,3,3,4-tetramethylpentane and 2,2,3,4-tetramethylpentane.

While the methylation may be carried out by various reactions, it is presently preferred to employ the reactions with dimethyl zinc because these reactions have been found to give appreciable yields, are relatively easily carried out, and are relatively inexpensive. Reaction (3a) is for the production of tetrane and (3b) is for the production of the other two isononanes.

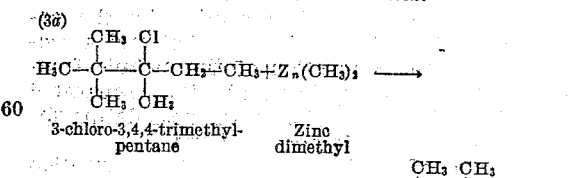

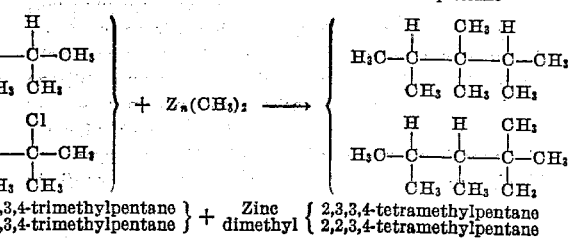

The methylation by means of the dimethyl zinc reactions (3a) and (3b), are preferably carried out in a non-reactive hydrocarbon solvent such as isooctane, or any other inert solvent such as hexanes, heptanes or mixtures thereof which can be conveniently separated from the reaction products. A preferred embodiment involves separately dissolving the octyl halide and the zinc dimethyl in isooctane. The octyl halide solution is added slowly to a cooled zinc dimethyl solution. Since the reaction takes place rapidly at room temperatures with a consequent lowering of the yield, it is preferred to cool the reactants to temperatures below about 10° centigrade. This addition causes the liberation of methane. When the addition of the halide solution is complete, the reaction mixture is permitted to stand for sufficient time to allow the reaction to reach completion. This time will vary with the temperature at which the reaction mixture is maintained; the higher the temperature the shorter time required for completion of reaction. The temperature of the reaction mixture is then slowly raised to a reflux temperature (which will be dependent on the solvent used) and the mixture permitted to reflux. Thereafter, sufficient water is slowly added to the reaction mixture to hydrolyze the zinc complex, and to dissolve the zinc chloride formed as a by product. On completion of the hydrolysis reaction, the aqueous layer is separated from the reaction mixture by siphoning, decanting, or like process, and the isononane can be recovered from the solvent by suitable fractional distillation. In order to effect the separation of 2,3,3,4-tetramethylpentane from 2,2,3,4-tetramethylpentane formed by the reaction (3b), the use of a column having about 40 or more theoretical plates has been found to give a satisfactory separation of these compounds. Other less efficient columns will effect a separation if sufficient care is exercised in carrying out the distillation. Prior to the distillation of the reaction mixture, it is preferred to remove the chlorine-containing impurities by suitably treating the reaction product with dilute alkaline solution such as sodium or potassium hydroxides or carbonates and the like, and more efficiently in alcohol solution.

The following example will show how this invention may be carried out but it is not limited thereto.

EXAMPLE I 740 grams (10 moles) of s-butyl alcohol were dissolved in 2,975 grams (21 moles) of 75 percent by weight sulfuric acid. The solution was transferred to a closed reaction vessel fitted with agitating means, refluxing means, means for introducing reagents at a controlled rate, and means of controlling the temperature. The sulfuric acid solution of s-butyl alcohol was heated to a temperature of about 64° centigrade and 740 grams (10 moles) of t-butyl alcohol were introduced slowly and continuously therein over a period of 8 hours; the reaction mixture was agitated and maintained at a substantially constant temperature throughout the reaction period. Thereafter, the reaction mixture was cooled to room temperature, and allowed to remain undisturbed until an oil phase had completely separated from the mixture. The oil layer was then siphoned off and collected.

On distillation of 6,300 grams of this reaction product (the oil phase) through a column having approximately 60 theoretical plates the fractions boiling between about 112 to 113 degrees centigrade (3,4,4-trimethyl-2-pentene) and 116 to 117 degrees centigrade (2,3,4-trimethyl-2-pentene) were separated and collected; 1,150 grams of the 112 to 113° fraction and 1,865 grams of the 116 to 117° fraction were collected.

The 112 to 113° fraction was then slowly added to a stream of anhydrous hydrogen chloride and passed through a reaction zone maintained at a temperature of about minus 60° centigrade at a rate whereby approximately 60% of the olefin was converted to the octyl chloride of Equation 2a. The product was washed, dried and fractionated. In this manner 716 grams of substantially constant boiling (86°–88° centigrade at 62 mm. Hg) 3-chloro-2,2,3-trimethylpentane was obtained from the 3,4,4-trimethyl-2-pentene. The 2,3,4-trimethyl-2-pentene was treated in the same manner and the resulting product was 1410 grams of a mixture of 2-chloro-2,3,4-trimethylpentane and 3-chloro-2,3,4-trimethylpentane. (Boiling range 81°–83° centigrade at 57 mm. Hg.)

(A) TETRANE (2,2,3,3-TETRAMETHYLPENTANE)

4.15 moles (614 grams) of 3-chloro-2,2,3-trimethylpentane were mixed with 700 ml. of isooctane (2,2,4-trimethylpentane) and was allowed to react with the dimethyl zinc prepared from 7.75 moles of methyl iodide. The dimethyl zinc was in a solution with 500 ml. of isooctane. The reaction was carried out in a 5 liter 3-neck flask, fitted with reflux condenser, stirrer, separatory funnel, and means of conducting gaseous products from the reaction vessel. The bath temperature was 7° centigrade. After addition of 500 ml. of water, the reaction mixture was allowed to stand until the organic layer separated. This layer was recovered and was boiled for 2 hours with a 5% solution of potassium hydroxide in alcohol, washed, and fractionated in a column having approximately 50 theoretical plates. This distillation gave:

Table I

| Fraction No. | Head Temperature, ° C. | Volume, ml. | Refraction Index ($n_D^{20}$) |
|---|---|---|---|
| 1 | 96–120 | 1,130 | 1.3918 |
| 2 | 100–110 | 65 | 1.4059 |
| 3–4 | 110–116 | 231 | 1.4195–1.4225 |
| 5 | 116–138.6 | 27 | 1.4226 |
| 6 | 138.6–140.3 | 39 | 1.4226 |
| 7 | 140.3 | 150 | 1.4233 |

Distillation of the residue was continued in a smaller still having about 25 plates efficiency and gave:

| | | | |
|---|---|---|---|
| 8 | 140.3 | 77 | 1.4232 |
| 9 (Residue) | 140.3 | 10 | 1.4379 |

Fraction 1 was recovered isooctane. Alkene by-products of the reaction of the alkyl chloride were contained in fractions 2–5. By the low refractive indices of these fractions, it is indicated that this material consisted mostly of 3,4,4-trimethyl-2-pentene. The yield of 2,2,3,3-tetramethylpentane (fractions 6, 7, and 8) amounted to 37.7% based on alkyl chloride. Fraction 7 after filtration through silica gel, had the following properties: Freezing point minus 11.85° centigrade; boiling point 140.20° centigrade to 140.23° centigrade, at 760 mm. Hg; refractive index $n_D^{20}=1.4211$; density, $d^{20}=0.7565$, $d^{25}=0.7527$. The freezing point indicates a purity of about 99.5 mole percent.

(B) 2,2,3,4 AND 2,3,3,4-TETRAMETHYLPENTANES

By use of the same procedure described above, two runs were made in which a total of 8.35 moles of the mixture of 2-, and 3-chloro-2,3,4-trimethylpentanes was reacted, at 10° centigrade, with the dimethyl zinc from 15.5 moles of methyl iodide. The combined products isolated as in (a) above were refluxed with alcoholic potassium hydroxide, washed, dried, and distilled. This operation gave:

*Table II*

| Fraction No. | Head Temperature, °C. | Volume, ml. | Refraction Index ($n_D^{20}$) |
|---|---|---|---|
| 1 | 95–100 | 2,051 | 1.3917 |
| 2 | 100–115 | 116 | 1.4080 |
| 3–4 | 115–119 | 440 | 1.4269–1.4267 |
| 5 | 119–130 | 31 | 1.4219 |
| 6–8 | 130.0–133.5 | 139 | 1.4158–1.4150 |
| 9 | 133.5–134.0 | 138 | 1.4152 |
| 10 | 134–140 | 64 | 1.4183 |

The residue was distilled in a column having approximately 25 theoretical plates and gave:

| | | | |
|---|---|---|---|
| 11 | 140.0–141.5 | 10 | 1.4212 |
| 12 | 141.5–142.0 | 60 | 1.4218 |
| 13 | 142.0–143 | 20 | 1.4221 |
| 14 | 143–165 | 10 | 1.4271 |
| 15 (Residue) | | 83 | 1.4570 |

Fraction 1 was recovered isooctane; fractions 3–4 were alkene byproducts; indicated to be mostly 2,3,4-trimethyl-2-pentene by the refractive indices. The total yield of tetramethylpentanes (fractions 6–14) amounted to 30% based on alkyl chloride. These tetramethylpentanes consisted of about 71% 2,2,3,4-tetramethylpentane, and about 29% 2,3,3,4-tetramethylpentane.

Fraction 9, after filtration through silica gel, had the following properties: freezing point, 122.54° centigrade; boiling point 133.3–133.4° centigrade at 760 mm. Hg; refractive index, $n_D^{20}$ = 1.4148, $n_D^{25}$ = 1.4127; density $d^{20}$ = 0.7397, $d^{25}$ = 0.7358.

Fraction 12 was filtered through silica gel, and the eluate used for measurement of physical properties, which were as follows: boiling point, 141.3–141.4° centigrade at 760 mm. Hg; refractive index $n_D^{20}$ = 1.4217; $n_D^{25}$ = 1.4196; density $d^{20}$ = 0.7545, $d^{25}$ = 0.7512.

As shown by the foregoing description and examples a new method for the production of isononanes has been presented.

While the invention as particularly described has discussed a method for the production of isononanes it is not limited thereto; the co-polymerization of secondary and tertiary alcohols other than the butyl alcohols which yield olefinic raw materials for the production of other highly branched hydrocarbons.

While the invention as particularly described involves the methylation by means of dimethyl zinc reactions it is not limited thereto. Other reactions such as those involving methylmagnesium halides are also applicable. Further variations of the dimethyl zinc methylation can also be employed to yield different types of substitutions for example reactions with diisopropyl zinc can yield other highly branched hydrocarbons.

The paper, "Preparation and Physical Properties of Several Aliphatic Hydrocarbons and Intermediates" by Howard, Mears, Fookson, Pomerantz and Brooks published in the "Journal of Research of the National Bureau of Standards," vol. 38, p. 365 (March 1947) gives a further discussion of the preparation and properties of the compounds of this invention.

Since many widely differing embodiments of this invention will occur to one skilled in the art, the invention is not limited to the specific embodiments illustrated and described, and changes and variations of the invention can be made without departing from the spirit and scope thereof.

What is claimed is:

1. A method for the production of highly branched chain hydrocarbons which comprises co-polymerization of a secondary and a tertiary alcohol, hydrohalogenation of the olefinic products thereby produced, and thereafter methylating the hydrohalogenated olefins.

2. The method of claim 1 wherein dimethyl zinc is the methylating reagent.

3. A process for the production of isononanes; the method of claim 1 wherein t-butyl and s-butyl alcohols are co-polymerized to form 2,3,4-trimethyl-2-pentene and 3,4,4-trimyethyl-2-pentene.

4. A process for the production of tetrane which comprises co-polymerizing t-butyl and s-butyl alcohols, separating therefrom the olefinic fraction boiling between about 111.5 to 113.5 degrees centigrade, hydrohalogenating said fraction, and thereafter substituting methyl groups for the halogen atoms in the hydrohalogenated product.

5. A process for the production of 2,2,3,4-tetramethylpentanes and 2,3,3,4-tetramethylpentane which comprises co-polymerizing t-butyl alcohol and s-butyl alcohol, separating therefrom the olefinic fraction boiling between about 116 to 117 degrees centigrade hydrohalogenating said fraction, substituting methyl groups for the halogen atoms in the hydrohalogenated product and thereafter fractionally distilling said methylated product to separate the 2,2,3,4 and 2,3,3,4-tetramethylpentanes.

6. A method for the production of tetrane which comprises hydrohalogenating 3,4,4-trimethyl-2-pentene and substituting methyl groups for the halogen atoms in the resulting reaction product.

7. A method for the production of 2,2,3,4-tetramethylpentane and 2,3,3,4-tetramethylpentane which comprises hydrohalogenating 2,3,4-trimethyl-2-pentene, substituting methyl groups for the halogen atoms in the resulting reaction product, and fractionating the methylated product to separate 2,2,3,4- and 2,3,3,4-tetramethylpentanes.

8. The method for the production of isononanes which comprises co-polymerizing s-butyl alcohol and t-butyl alcohol in the presence of sulfuric acid, fractionating said co-polymerized reaction product to separate therefrom 3,4,4-trimethyl-2-pentene and 2,3,4-trimethyl-2-pentene separately treating said isolated olefins with anhydrous hydrogen chloride, substituting methyl groups for the chlorine atoms in said hydrochlorinated products, and fractionating the methylated products whereby 2,2,3,3-tetramethylpentane is produced by the treatment of 3,4,4-trimethyl-2-pentene and 2,2,3,4-tetramethylpentane and 2,3,3,4-tetramethylpentane is produced by the treatment of 2,3,4-trimethyl-2-pentene.

9. The method of claim 8 wherein dimethyl zinc is the methylating reagent.

10. The method of claim 8 wherein dimethyl zinc is the methylating reagent and said methylation is carried out in an inert solvent at the temperatures not greater than about 10 degrees centigrade.

FRANK L. HOWARD.
DONALD B. BROOKS.

REFERENCES CITED

The following references are of record in the file of this patent:

UNITED STATES PATENTS

| Number | Name | Date |
|---|---|---|
| 2,404,927 | Schmerling et al. | July 30, 1946 |

OTHER REFERENCES

Whitmore et al., J. A. C. ., 63, 756-7 (March 1941) 2 pages.

Certificate of Correction

Patent No. 2,512,649 June 27, 1950

FRANK L. HOWARD ET AL.

It is hereby certified that error appears in the printed specification of the above numbered patent requiring correction as follows:

Column 1, line 11, for "2,2,3,3," read *2,2,3,3-*; column 3, line 2, after the word "material" insert a period; same line, beginning with the word "polymerized", strike out all to an including the syllable and period "terial." in line 11, same column;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*